United States Patent

[11] 3,588,377

[72] Inventor Louis C. Meyer
Box 434, Rte. 1, Morrison, Colo. 80465
[21] Appl. No. 675,809
[22] Filed Oct. 17, 1967
[45] Patented June 28, 1971

[54] CONTAINER FOR HOLDING MAGNETIC TAPE ON EDGE AND HANDLING DEVICE THEREFOR
4 Claims, 9 Drawing Figs.

[52] U.S. Cl. .......... 179/100.2, 274/41.4, 340/174.1
[51] Int. Cl. .......... G11b 5/74, G11b 23/08, B65b 75/02
[50] Field of Search .......... 179/100.2 (C), (MI), (Z); 274/23.1, 41.4; 340/174.1 (C)

[56] References Cited

UNITED STATES PATENTS

| | | | |
|---|---|---|---|
| 2,247,847 | 7/1941 | Pfleumer | 179/100.2 |
| 2,265,879 | 12/1941 | Thurm | 179/100.2 |
| 2,498,746 | 2/1950 | Walker | 274/41.4 |
| 2,620,389 | 12/1952 | Potter | 179/100.2 |
| 3,361,429 | 1/1968 | Santelli | 274/23 |

FOREIGN PATENTS

| | | | |
|---|---|---|---|
| 1,059,681 | 6/1959 | Germany | 179/100.2 |

*Primary Examiner*—J. Russell Goudeau
*Attorney*—John E. Reilly

ABSTRACT: A tape container unit enables storage and retrieval of information on tape without necessitating removal of the tape from the container or otherwise feeding or driving the tape past a pickup head. This is accomplished by supporting the tape in fixed relation within its container so that the head can be moved into contact with the tape surface and the container driven to advance the tape surface across the head for recording or playback of information on the tape. Further the head can be accurately positioned at any desired location on the tape surface to permit random access of information without winding or rewinding the tape.

INVENTOR.
LOUIS C. MEYER
BY John E. Reilly
ATTORNEY

INVENTOR.
LOUIS C. MEYER
BY John E. Reilly
ATTORNEY

INVENTOR.
LOUIS C. MEYER
BY
John E. Reilly
ATTORNEY

CONTAINER FOR HOLDING MAGNETIC TAPE ON EDGE AND HANDLING DEVICE THEREFOR

This invention relates to new and useful means for the storage and retrieval of information on a sound recording and reproducing medium, such as, a magnetic tape; and more particularly relates to novel and improved forms of tape containers wherein information can be recorded and played back in a rapid, dependable manner without necessitating handling of the tape or removal from its container.

Various systems and techniques have been proposed for storage of magnetic tape and tape reels in a container in such a way as to minimize handling of the tape, and to prevent collection of dust or other foreign matter on the tape surface when exposed for recording or playback of information as well as to reduce operating time. Systems now in use customarily require unwinding and rewinding of the tape in order to advance it past a read or write head, for example, by training the tape for advancement between a pinch roller and drive capstan located either internally or externally of the tape container. However, systems presently in use require relatively complex and expensive container constructions or external drive systems and have not satisfactorily overcome the aforementioned problems. Moreover, searching for specific information customarily requires that the tape be sequentially threaded or advanced until the information is located and, once played, requires rewinding of the tape resulting in expenditure of unnecessary time and wear in handling the tape. It is therefore an object of the present invention to overcome the above and other disadvantages and drawbacks in known tape handling systems by devising a tape storage container in which information can be recorded on the tape and be played back without necessitating removal of the tape from its storage container or winding, rewinding or otherwise handling the tape in order to gain access to information thereon.

It is another object of the present invention to provide for a container in which the tape is supported in fixed stationary relation therein and a read or write head is advanced into contact with the tape for more accurate, rapid recording and playback of information thereon.

It is a further object of the present invention to provide for a novel and improved tape handling system which eliminates use of a tape reel and obviates any winding, rewinding or otherwise handling the tape with quick access to specific data or information programmed on the tape either sequentially or randomly, and further permits most efficient use of storage space with dustproof construction all in a single unit while minimizing the cost-to-weight ratio and substantially reducing operating time.

In one form of the present invention, the magnetic tape is spirally wound in a container and supported in the container by bonding or adhesively securing the lower edge of the tape to the bottom of the container. A read or write head is advanced into contact with the outer end of the tape, or at any desired point along the tape surface, and upon rotating the container the tape is advanced spirally with respect to the head while the head is free to move inwardly along the tape surface toward the center of the container. In another form, the tape is arranged in rows and the information recorded or played back either by advancing the head along each row and from row to row, or by reciprocating the container to advance each tape row with respect to the head. In either form, random access is greatly facilitated since the head may be positioned at any desired location on the tape surface.

The above and other objects, advantages and features of the present invention will become more readily appreciated and understood from a consideration of the following detailed description of preferred and alternate forms of the present invention when taken together with the accompanying drawings, in which.

Figure 1:
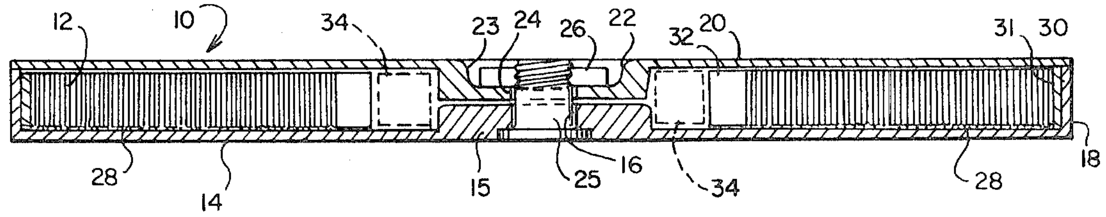
FIG. 1 is a sectional view of a preferred form of tape container with the cover assembled.

Referring in detail to the drawings, there is illustrated in FIG. 1 a generally cylindrical tape container 10 for a magnetic tape 12, the container having a circular baseplate 14 provided with a relatively thick hub 15 and a central aperture 16. The container includes an outer peripheral sidewall 18 projecting upwardly from the outer edge of the base, the sidewall being of a width greater than that of the tape, and of course, the width of the sidewall may suitably vary according to the tape width.

A cover plate 20 conforms in size and configuration to the baseplate 14 and includes a hub 22 provided with a slight depression 23 with a central aperture 24 adapted to be aligned with the aperture 16 in the baseplate. In assembled relation, the hub 22 will abut the upper surface of the hub 15 when the outer edge of the cover is sealed against the upper edge of the sidewall 18. The cover may be retained in assembled relation by a bolt 25 inserted upwardly through the aperture 16, and a nut 26 is threaded onto the bolt and seated within the depressed portion of the hub to fasten the base and cover plates together in sealed relation.

Figures 2, 4:
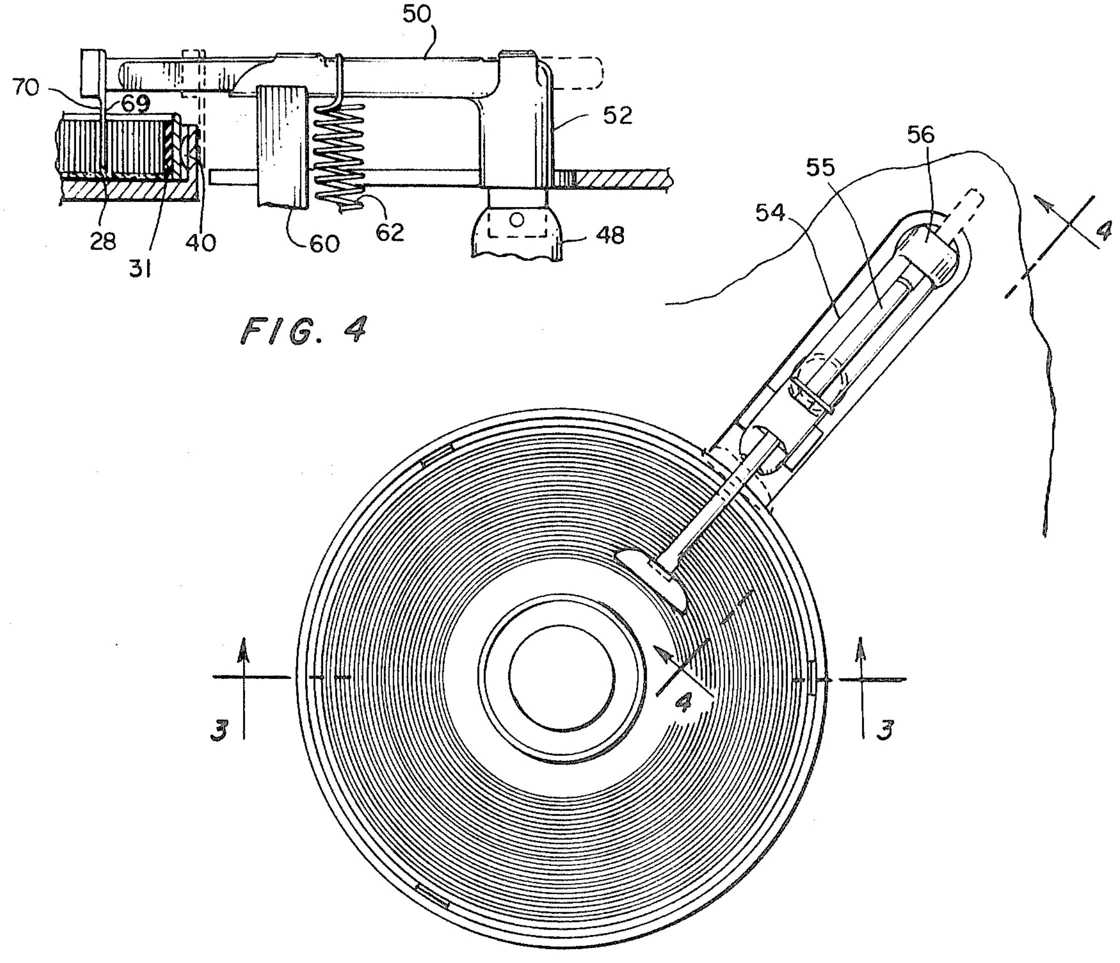
FIG. 2 is a plan view of the tape container of FIG. 1 mounted on a turntable for recording or playback of information on the tape.
FIG. 4 is a view partially in section of the turntable taken on lines 4–4 of FIG. 2.

As illustrated in FIGS. 1 and 2, the tape T is spirally wound within the container with its lower edge disposed against the upper or inner surface of the baseplate 14 and in this connection it will be noted that the tape is not placed on a reel but is mounted directly within the container. An important feature of the present invention resides in mounting and supporting the tape in substantially upright, closely spaced relation within the container, this being accomplished by securing the lower edge of the tape to the baseplate preferably with a bonding agent 28. Suitably the bonding agent may be composed of various commercially available rubber cements capable of effecting a permanent bond between the metal or plastic baseplate and the tape while at the same time having a slight amount of "give" or inherent resiliency so as not to resist flexing of the tape while holding it securely in place. Nevertheless, it is not essential that the bonding agent flex or otherwise give with the tape since the tape possesses sufficient flexibility to permit inward displacement in a manner to be described. It is also desirable that the tape be bonded in evenly spaced relation within the container at the desired loading density. For example, this may be accomplished by application of the bonding agent to either or both the lower edge of the tape and the upper surface of the baseplate prior to insertion of the tape in place and the tape being supported to have the proper loading density until the bonding agent has been firmly set. Once positioned in place, the outer free end 30 of the tape may be affixed to a flexible band or liner 31 extending around the outer periphery of the tape. In turn, the inner end 32 of the tape may be left free or supported in a similar manner by a relatively thick, inner flexible band or liner 34 as shown and to be hereinafter described with reference to FIGS. 5 and 6.

Figure 3:
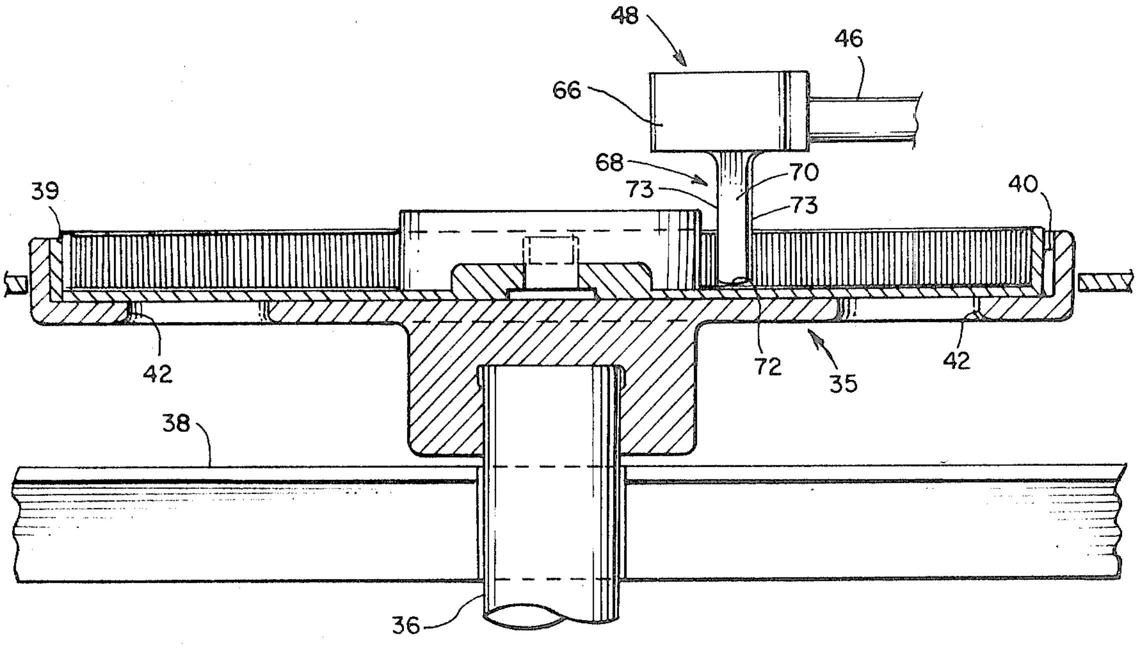
FIG. 3 is a sectional view taken on lines 3–3 of FIG. 2.

In FIGS. 2 and 3 the container is illustrated with the cover removed and is mounted on a turntable 35. The turntable may be of conventional form and is specifically illustrated as being keyed for rotation on a central drive shaft or spindle 36 projecting upwardly through a base support 38 from a reversible, variable speed motor drive, not shown. The turntable proper includes a hollow cylindrical space 39 for insertion of the tape container, and the container is locked for rotation with the turntable by suitable means, such as, a tension member 40 on the inner sidewall of the turntable which bears against the sidewall 18 of the container. In addition, the turntable is provided with fingerholes 42 to facilitate unloading and removal of the container from the turntable.

A magnetic head 44 is mounted on the free end of a support arm 46 pivoted on a supporting column 48 extending upwardly from the base support alongside the turntable 35. Most desirably, the support arm is constructed and arranged to hold the head in stationary relation as the tape is advanced by rotation of the container past the head pickup surface. However it will be apparent that by virtue of the spiral arrangement of the tape, the head must be free to advance inwardly in a radial direction toward the center of the turntable. Accordingly, the support arm 46 is defined by an outer stationary arm portion 50 extending laterally from a pivotal mounting bracket 52 secured to the upper end of the support column, the outer arm portion being formed with an upwardly facing, generally U-shaped channel 54 to receive an inner telescoping arm portion 55. The inner arm portion 55 is defined by an elongated bar, being generally rectangular in cross section to conform to the cross-sectional size and shape of the U-shaped channel so as to permit slidable movement of the inner arm portion in a longitudinal direction through the channel while being restrained against lateral shifting or turning. The head 44 is attached to the inner free end of the arm 55 opposite the mounting bracket, and the arm is held against shifting or release from the channel by suitable brackets or straps 56. In order to position the head in contacting relation to the tape surface and to resist any tendency of the head to move or shift vertically as the tape is advanced thereacross, a cradle 60 extends upwardly from the base support between the supporting column and outer peripheral edge of the turntable and has an upper concave surface to receive the undersurface of the support arm 46. In addition, a tension spring 62 is affixed to the base support and has its upper end attached to the support arm directly behind the cradle in order to urge the arm 46 down against the cradle when the head is accurately aligned with the tape surface.

Figures 5, 6:
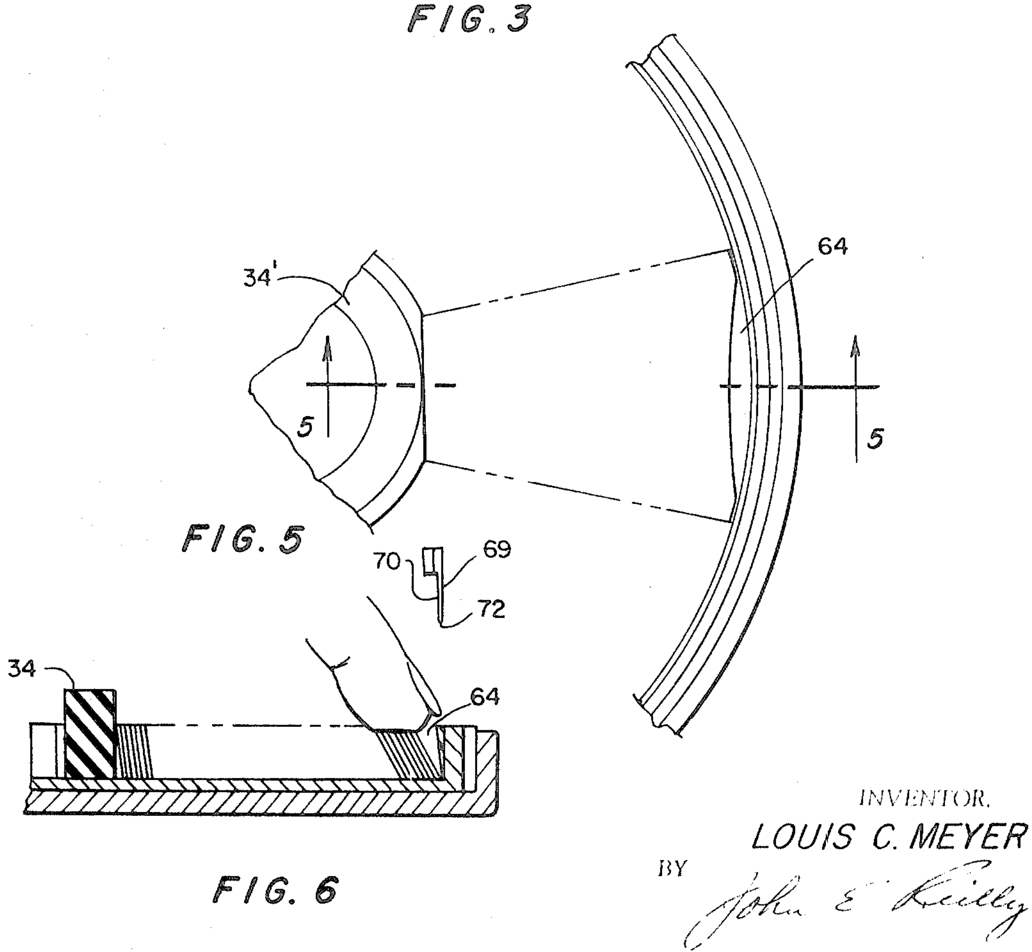
FIG. 5 is a fragmentary view in plan of a modified form of tape storage container and further illustrating the inward displacement of the tape when the head is inserted.
FIG. 6 is a fragmentary sectional view of the modified form of FIG. 5 and further showing the tape being flexed inwardly to receive the head.

The tape when fixed to the base of the container in the manner described can be flexed inwardly for example to create an angular gap or space for insertion of the head, for example, as illustrated in the modified form of FIGS. 5 and 6. For the reason that the tape surface slopes upwardly and inwardly when displaced the tape engaging surface on the head is most desirably formed at a corresponding angle so as to be aligned with the tape surface. To this end, the head is provided with a relatively thick connecting end portion 66 for attachment to the inner telescoping arm and a relatively thin, downward extension 68 containing the necessary read and write coils, not shown. The extension 68 includes a rear surface 69 extending vertically from the connecting end portion and a front face 70 converging downwardly and rearwardly at a slight angle to the vertical and terminating in a relatively sharp lower end 72. Moreover, in cross section, the front and rear faces of the extension may be generally convex in cross section and terminate in relatively sharp edges 73 along opposite sides. In this way, the extension 68 may be readily inserted at any desired point to enter between the tape layers without damaging the tape, as illustrated in FIG. 4. Once inserted, the tape can easily be threaded past the head extension and the spring member 62 will overcome any tendency of the head to weave or skew notwithstanding the loading density of the tape.

In recording or reading an entire load of tape, the head may be manually inserted adjacent the outer end of the tape and the tape container rotated by the drive shaft to advance the tape past the inner head surface 70. As the tape is rotated the head will advance inwardly in a radial direction toward the center of the container until it reaches the inner end of the tape. At that point the turntable is stopped, the head lifted and returned to an out-of-the-way position by sliding the inner arm portion rearwardly through the outer arm portion 55 to a retracted position. For random access of information, the head is extended over the tape surface to the desired point and inserted between the tape layers. Thereafter, the tape container may be rotated to retrieve the information stored on the tape through the head surface 70. Of course the speed of the turntable drive may be regulated to compensate for the progressively increased speed of travel of the tape relative to the head as the head advances toward the center of the container unit; and in general the turntable speed is regulated merely to insure that the tape is driven at the same speed both in recording and reading information.

Referring to the modified form of FIGS. 5 and 6, the tape 12 is supported within container 10 by placement of a relatively thick, annular compressible insert 34' between the inner end of the tape and the hub portion 15. The tape is not secured along its lower edge to the base of the container; instead it is free to be displaced inwardly under the pressure of the head in recording or playing back information. The compressible insert 34' will yieldingly support the tape layers in upright relation as the container is rotated to advance the tape surface past the head 48, and therefore should be of sufficient thickness to firmly support the tape against undue lateral shifting as it is advanced across the head. As shown in FIG. 5, the insert 34' is dimensioned to project upwardly beyond the sidewall of the container when the cover is removed; and as shown dotted in FIG. 1, the insert 34' is compressed downwardly to increase its thickness and force it to expand radially against the inside of the tape in order to pack the tape tightly within the container when not in use.

Figure 7:
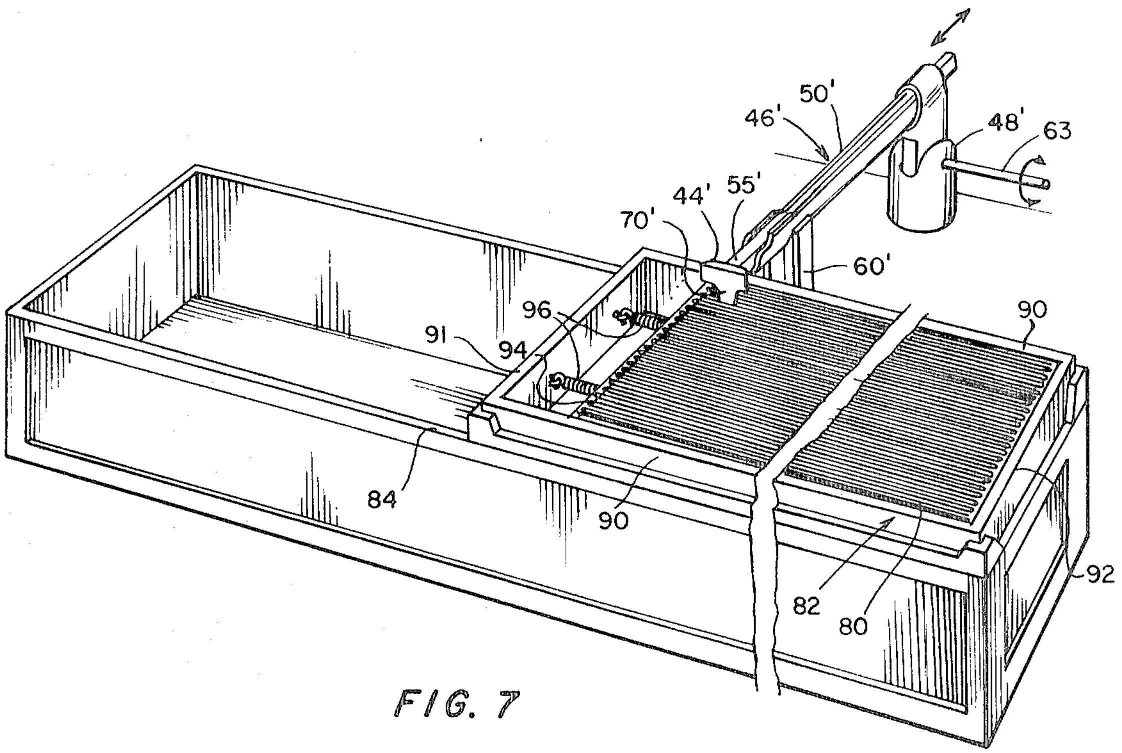
FIG. 7 is a perspective view of another modified form of tape container and handling system, in accordance with the present invention.
Figure 8:
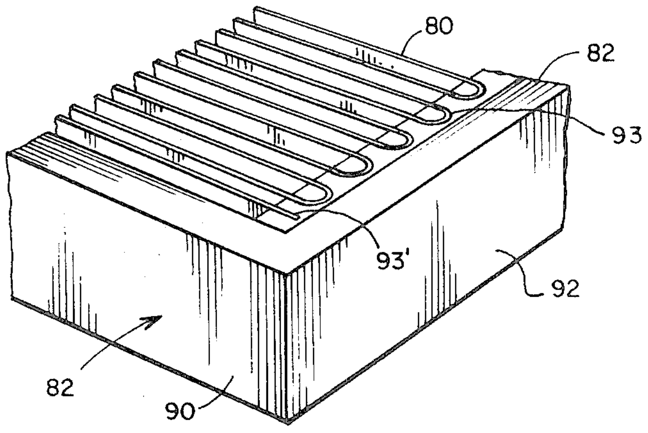
FIG. 8 is a detailed perspective view of the tape container shown in FIG. 7.
Figure 9:
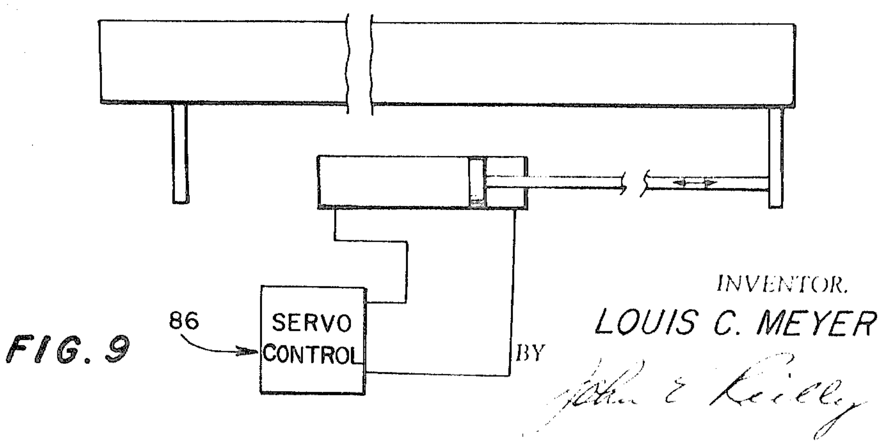
FIG. 9 is a somewhat schematic view of a typical drive unit for the tape container of FIGS. 7 and 8.

In the modified form of FIGS. 7 to 9, magnetic tape 80 is arranged in longitudinal rows within a container 82. In turn, the container 82 is disposed for reciprocal movement along guide tracks 84 on opposite sides of an open stationary support 85 under the control of a reciprocal drive mechanism 86. As shown in FIG. 9, the drive mechanism 86 may take the form of a servo-operated double-acting cylinder which is positioned in the base of the support 85 to engage the undersurface of the container 82 and cause it to advance back and forth at a high rate of speed for the purpose of recording or reading information on the tape.

In recording and playing back information on the tape, the head assembly utilized may be essentially the same as that employed in the preferred form and accordingly like parts are correspondingly enumerated. Thus, as illustrated in FIG. 7, the magnetic head 44' is mounted at one end of an inner telescoping arm portion 55' slidable within an outer fixed support arm 50 and the latter being pivotally mounted by a pivot pin 63 on the support column 48'. For the purpose of illustration, pivotal movement of the head into and away from each tape row may be controlled by a servomechanism, not shown, secured for limited reversible rotation of the pivot pin 63. In order to advance the head 44' from row to row suitable means, such as, a stepping drive, not shown, may be connected to the inner arm portion 55' and correlated with lifting of the head by the servomechanism at the end of each row to advance the head a fractional distance above the next row, followed by downward pivotal movement into engagement with the next tape row. In this time interval, the drive mechanism 86 for the tape container is adapted to reverse the container at the end of each row and return it back to the starting point for reading information in the next row. Thus, each time the magnetic head will be inserted at the same end of the container and the container advanced across the head in the same direction to read information from each row of tape.

Considering in more detail the arrangement of the tape in the container, the container 82 is shown as having opposite longitudinal sides 90 interconnected by end portions 91 and 92. The end portion 92 is provided with closely spaced, arcuate or generally U-shaped slots 93, and at the opposite end a slide panel 94 is similarly provided with closely spaced arcuate slots 95. The tape 80 is looped back and forth across the container through each slot in succession and opposite ends of the tape may be attached within narrow slots on opposite sides of the end portion 91. Preferably, the slide panel 94 is attached to the end portion 91 by compression springs 96 urging the slide member toward the end portion 91 thereby tightening the tape rows while at the same time permitting each row to yield to some extent when in direct contact with the pickup surface on the head 44'.

In practice, the head may be inserted into position at one end of the row and the container driven by the drive mechanism 86 to advance the tape surface in the first row across the head until the head reaches the opposite end of the tape. The head is then lifted by the servomechanism and the container returned to its starting point whereupon the head is lowered and inserted into contact with the next row. In succession and at a high rate of speed each row of tape may be advanced across the head surface, and the head lifted and advanced a fractional distance by the servomechanism as the container is reversed in direction for insertion into the next row. It will be evident that the container 82 may remain stationary and the head driven along each row then advanced between the rows and reversed for recording or reading the information on the tape. Further the tape rows may be comprised of separate strips of tape each affixed at opposite ends of the container.

In the different forms of invention herein set forth the specific construction and arrangement of the head may be suitably modified depending upon tape density and width as well as the character of information being reproduced, bearing in mind that the important feature of the invention resides in the manner in which the tape may remain in position within its container and the head advanced into alignment with the tape for recording or retrieving information thereon. As a result, only the head moves into contact with the tape surface thereby minimizing handling, wear and tear on the tape and materially reducing operating time. Moreover, the necessity of a separate reel is eliminated as well as a drive system for unwinding or rewinding the tape together with other advantages hereinbefore mentioned.

In the forms of invention described, the head may be mounted for impressing or removing information on or from either side of the tape surface. As shown in FIGS. 1 to 4 the head surface 70 is advanced into alignment with the outside of the tape. Instead, the inner surface of the tape may be magnetized and the head construction modified for reading or writing information on the inner surface, and the same holds true for the other forms of invention.

It is therefore to be understood that various other modifications and changes may be made in the specific construction and arrangement of parts comprising the preferred and modified forms of the present invention without departing from the spirit and scope thereof as defined by the appended claims.

I claim:

1. In apparatus for the storage and retrieval of information sequentially or at random on a tape, the combination comprising a tape container of generally rectangular configuration, an elongated flexible tape adapted for reading and writing information on the surface thereof, means supporting said tape on edge in a plurality of longitudinally extending rows, the rows of tape looped back and forth through slots at opposite ends of the container and the rows arranged in substantially upright, closely spaced relation to one another in said container, tensioning means biasing one end of said container to yieldingly support the rows of tape edgewise within said container, a read/write head insertable between adjacent layers of said tape for alignment with the surface of said tape, and means for reciprocably advancing said container with respect to said head to advance the tape surface past said head for reading or writing information on the tape surface.

2. In apparatus according to claim 1, further including a stationary support for said tape container including longitudinal guide rails adapted to support said tape container for reciprocal movement therealong.

3. In apparatus according to claim 1, further including a support arm for said head being pivotally mounted at one end for vertical swinging movement of said head into and away from engagement with said tape, said support arm being comprised of inner and outer telescoping arm portions, and said inner telescoping arm portion being axially slidable within said outer telescoping arm portion to permit free radial movement of said head as the tape surface is advanced therealong.

4. In apparatus according to claim 3, further including means biasing said support arm in a direction to advance said head into aligned relation with the tape surface and to maintain said head in aligned relation as the tape surface is advanced therealong.